United States Patent [19]

McNamara

[11] 3,971,641
[45] July 27, 1976

[54] GAS SCRUBBER OF THE WET COLLECTOR TYPE

[75] Inventor: Earl J. McNamara, Trenton, Mich.

[73] Assignee: Taylor & Gaskin, Inc., Detroit, Mich.

[22] Filed: Feb. 24, 1975

[21] Appl. No.: 552,170

Related U.S. Application Data

[63] Continuation-in-part of Ser. No. 488,587, July 15, 1974, abandoned.

[52] U.S. Cl.................................... 55/223; 55/230; 55/248; 261/89; 261/119 R
[51] Int. Cl.².................. B01D 47/02; B01D 47/08
[58] Field of Search............ 55/85, 89, 90, 95, 223, 55/229, 230, 244, 260; 261/89, 119 R

[56] References Cited
UNITED STATES PATENTS

| | | | |
|---|---|---|---|
| 1,868,618 | 7/1932 | Wagner | 261/89 |
| 3,054,244 | 9/1962 | Hersh | 55/223 X |
| 3,253,819 | 5/1966 | Talbot | 261/89 X |
| 3,328,009 | 6/1967 | Panzica et al | 261/89 X |
| 3,347,535 | 10/1967 | Schimpke | 55/260 X |
| 3,443,696 | 5/1969 | Schutte | 55/408 X |
| 3,581,467 | 6/1971 | Donnelly | 55/89 |

Primary Examiner—Frank W. Lutter
Assistant Examiner—Kathleen J. Prunner
Attorney, Agent, or Firm—Burton, Parker & Schramm

[57] ABSTRACT

A gas scrubber of the wet collector type induces a gas flow under a negative pressure through a housing between a gas inlet and a gas outlet. The housing includes a scrubbing liquid reservoir, and means in the housing cooperating therewith to define a gas scrubbing zone above the reservoir and through which the gas moves. A tunnel open to the atmosphere extends transversely of the housing adjacent the scrubbing zone with the interior of the tunnel being at atmospheric pressure, which is higher than the gas pressure in the housing. A spinner shaft in the tunnel projects through the tunnel wall and carries a liquid diffusing spinner in the scrubbing zone. The shaft is solely supported by bearing means in the tunnel. A pump draws liquid from the reservoir and directs it against the spinner to diffuse the liquid across the scrubbing zone. By virtue of the higher pressure in the tunnel the bearings supporting the spinner are not contaminated by the scrubbing action in the housing. The spinner shaft may be free wheeling and driven by the action of the liquid impingement from the pump against the spinner.

5 Claims, 7 Drawing Figures

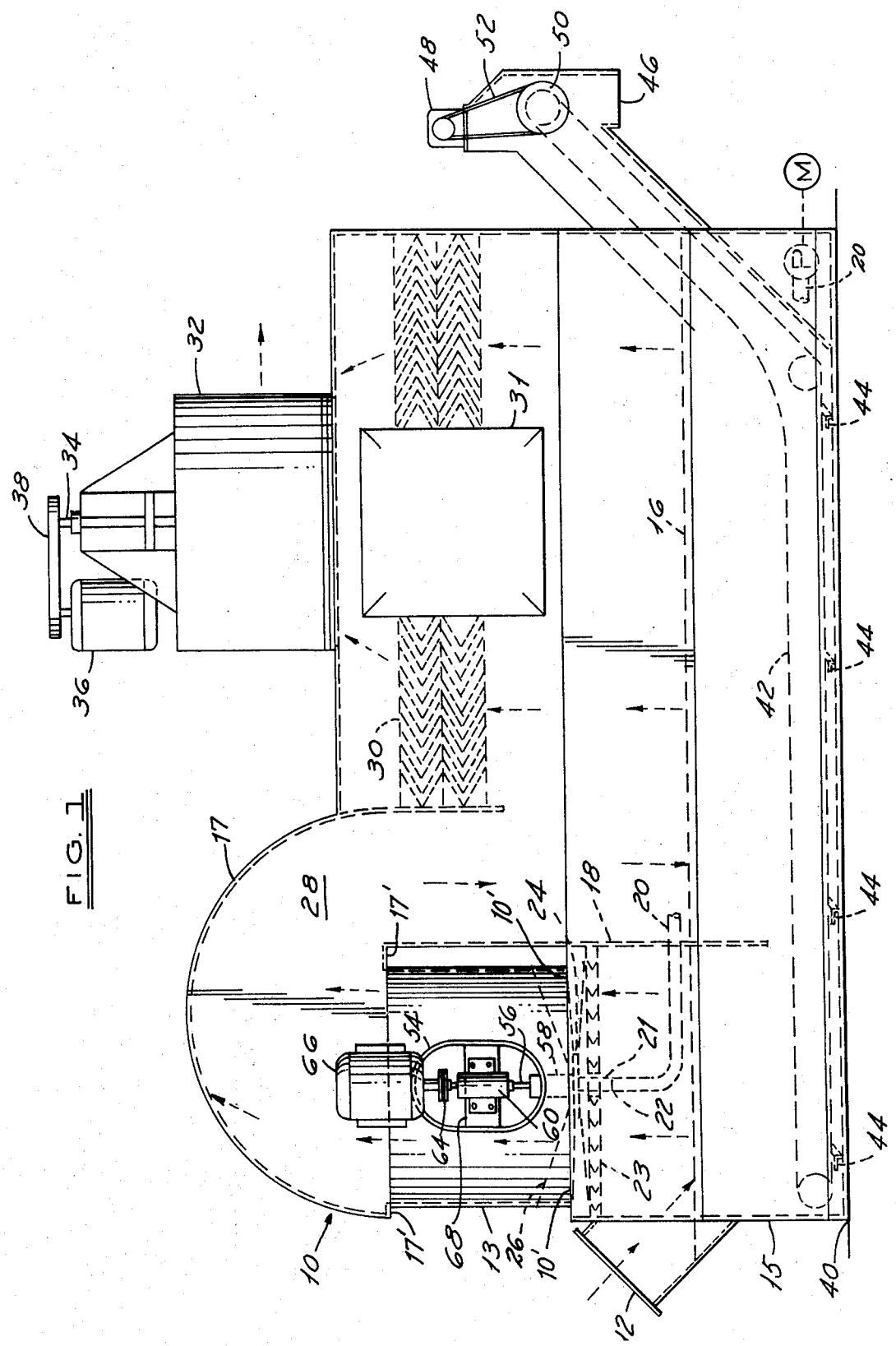

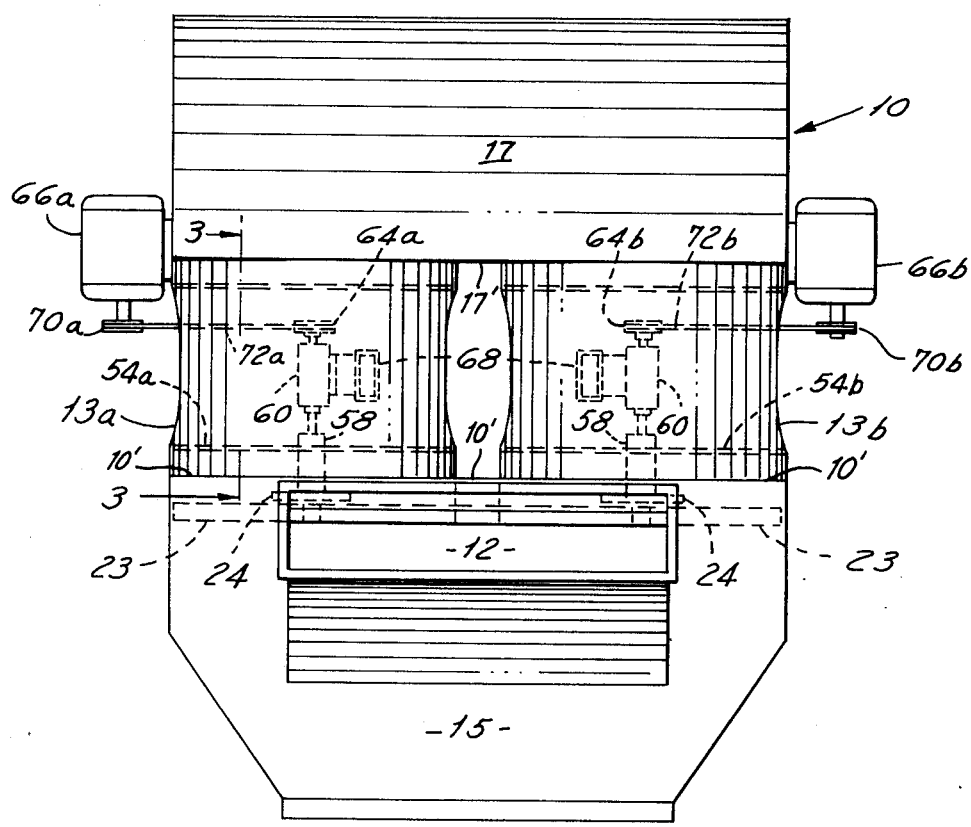
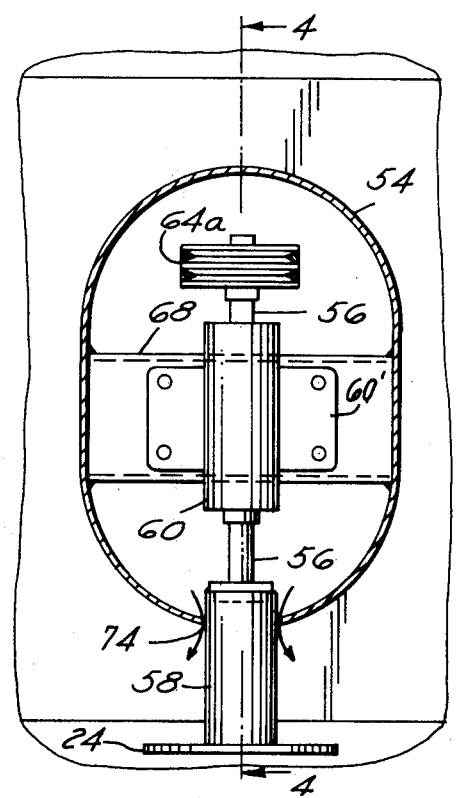
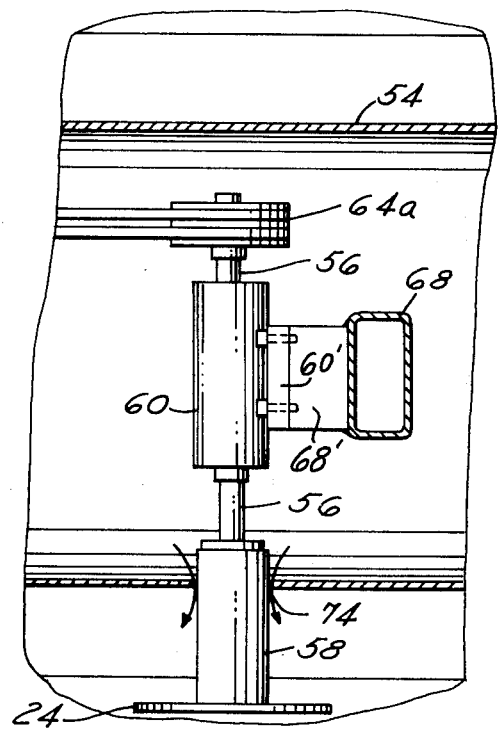

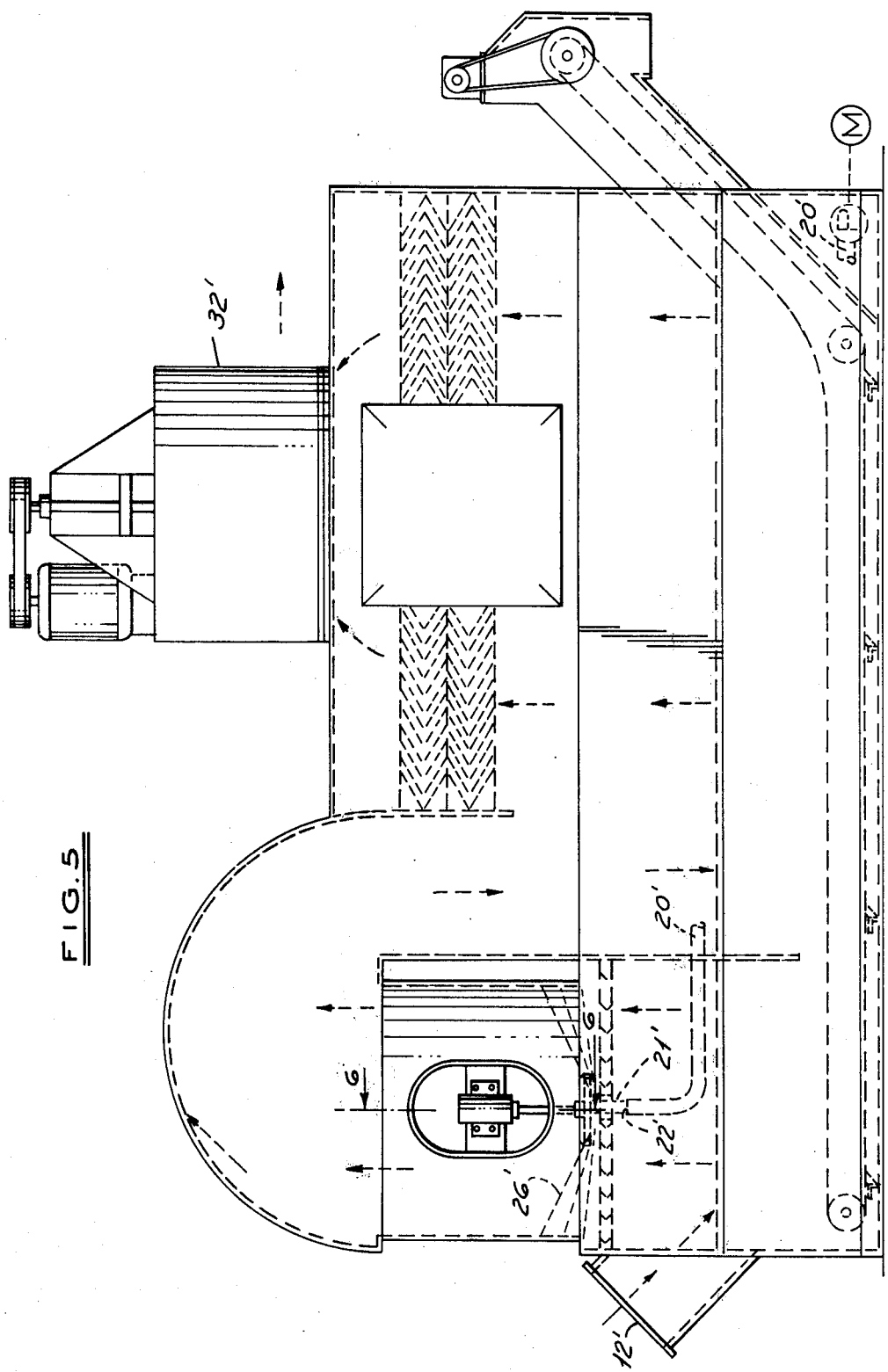

3,971,641

GAS SCRUBBER OF THE WET COLLECTOR TYPE

RELATED APPLICATION

This application is a continuation-in-part of my application Ser. No. 488,587, filed July 15, 1974, and now abandoned.

BACKGROUND OF THE INVENTION

The present invention is concerned with a gas scrubber of the wet collector type. The invention is concerned with the removal of particles of the micron or sub micron range entrained in a gas stream, preferably air. Gas streams are generally introduced into a liquid spray environment and are passed upwardly through a housing abruptly changing the direction of the gas stream in order to remove the particles entrapped therein. Gas scrubbers of the prior art have been described in such patents as U.S. Pat. Nos. 3,328,009, 3,347,535, 3,624,696, 3,205,641, and 3,581,467.

Many of the prior art apparatus, especially that described in the 641 patent, employ a spray of liquid in order to entrap the particles in the gas. A liquid is pumped onto an impingement surface. This impingement surface rotates by means of a spinner shaft which in turn is connected to a power means. The spinner shaft and its bearings generally are exposed to the environment of the air scrubber which may be either quite corrosive due to the chemical composition of the particles, or quite abrasive, or both. As the particles have a tendency to work themselves into the bearings of the shaft and destroy the bearings, periodically it is required to halt the operation of the gas scrubber in order to replace worn bearings and the like. The down time of the gas scrubber is therefore increased due to need to repair the spinner shaft and the bearings thereof.

It has been found that the down time can be substantially decreased if the bearings supporting the spinner shaft are not only removed from the environment of the gas scrubbing but also disposed in an environment of higher pressure than that where the scrubbing action occurs. It is therefore an object of the present invention to decrease the down time of a gas scrubber.

I have also found that an improvement in the efficiency of the gas scrubbing action may be obtained while at the same time the cost of manufacture and of operation of the gas scrubber can be reduced by eliminating the spinner shaft drive motor, so that the spinner shaft is "free wheeling," and utilizing a liquid diffusing spinner which is driven solely by the impingement of the liquid from the pump discharge against the spinner. Therefor, another object of the invention is to reduce the cost of manufacture and operation of a gas scrubber of the wet collector type without suffering any loss in efficiency, and in fact obtaining an improved efficiency.

SUMMARY OF THE INVENTION

The present invention is concerned with a gas scrubber of the wet collector type wherein gas such as air with particles therein may be introduced into a housing having a gas inlet, a gas outlet and means for moving the gas therebetween at a negative pressure. The spinner shaft is supported by bearings located in a tunnel which is at atmospheric pressure whereby the bearings are not contaminated by the particles being entrapped in the liquid. In addition, the spinner shaft may be free wheeling and driven by the impingement of the pump discharge against the spinner.

BRIEF DESCRIPTION OF THE DRAWING

FIG. 1 is a side sectional view of one form of the apparatus of the present invention;

FIG. 2 is a front view of the apparatus of FIG. 1 showing the preferred bifurcated housing;

FIG. 3 is a cross sectional view taken along the line 3—3 of FIG. 2 showing the spinner shaft means positioned in the tunnel of the housing;

FIG. 4 is a cross sectional view taken along the line 4—4 of FIG. 3;

FIG. 5 is similar to FIG. 1 but shows a free wheeling spinner shaft;

DESCRIPTION OF PREFERRED EMBODIMENTS

Figure 6:
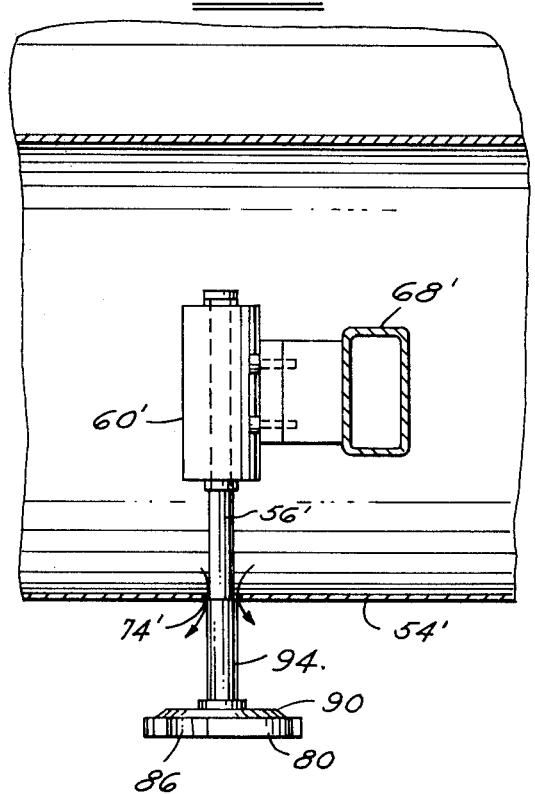
FIG. 6 is similar to FIG. 4 but shows a free wheeling spinner shaft.

The present invention is concerned with a gas scrubber of the wet collector type comprising a housing 10 defining a gas inlet 12, a gas outlet means 32, gas exhaust means including a shaft 34 carrying an exhaust blower or fan (not shown) adjacent the outlet and driven by a motor 36 through a belt drive 38. The exhaust means creates a negative pressure within the housing creating a gas flow from the inlet, through the housing, and out through the outlet means. The housing also includes a scrubbing liquid tank or reservoir 15 containing water maintained at a liquid level 16 by a suitable liquid level control and make-up water infeed system (not shown) which is conventional in this type of gas scrubber. The tank may comprise a rectangular structure, as is also conventional. On top of the tank the housing defines a closed structure through which the air to be scrubbed passes. The inlet 12 may comprise a rectangular opening as shown in FIGS. 1 and 2 which extends angularly downwardly such that gas entering the inlet strikes the surface 16 of the scrubbing water in the tank. A depending weir 18 causes the gas entering through the inlet 12 to be forced upwardly into the housing after striking the water surface. As a result of this gas to liquid surface contact and the abrupt change in gas flow direction, some of the larger gas entrained particles will be entrained in the liquid in the tank.

The weir 18 is a downward extension of a hood-like portion of the housing 10. The hood includes an upper smoothly curving wall 17 closed by side walls of the housing and a bottom wall portion 17'. A cylindrical housing portion 13 extends between the bottom wall 17' and a horizontal top wall 10', and opening through each, to establish gas flow communication of gas diverted upwardly from the surface 16 of the scrubbing liquid into the hood. Spaced below the lower end of the cylindrical portion 13 of the housing, as shown in FIG. 1, is a baffle array 23 comprising a parallel arrangement of closely spaced V-shaped baffles (arranged on edge as shown) which bridge across the opening into the cylindrical housing portion 13. The purpose of the baffle array is to uniformly distribute the gas therebelow, between the array and the liquid surface 16, so that when the gas passes upwardly through the cylindrical portion 13 it will be more uniformly distributed across the area thereof.

Immediately above the baffle array 23 and extending up into the cylindrical portion 13 of the housing is the gas scrubbing zone. Adjacent this zone a tunnel 54 extends transversely through the cylindrical portion 13. The tunnel comprises a closed wall elliptical tube like structure whose opposite ends are open to the atmosphere within which the scrubber is situated and are connected in sealed relation with the cylindrical wall of housing portion 13. As a consequence the interior of the tunnel is at a pressure equal to the atmospheric pressure which is higher than the negative pressure within the housing portion 13 of the scrubbing zone.

Mounted in the tunnel 54 is a bearing 60 carrying a spinner/diffuser shaft 56. The bearing is carried by a plate 60' which is bolted to a bracket 68' on a transverse tubular cross member 68 welded at opposite ends to opposite side walls of the tunnel, as best shown in FIGS. 3 and 4. The spinner/diffuser shaft projects downwardly at one end through an opening 74 in the bottom wall of the tunnel. Mounted on the lower end of the shaft is a scrubbing liquid spinner or diffuser 24 which may also be referred to as an atomizer or impingement disc. Its function is to break-up a stream of the scrubbing liquid directed at its underside and diffuse it in the form of droplets in a spray pattern across the scrubbing zone. The contaminating particles in the gas stream collide with these droplets and are taken up by them for return to the tank 15. Many of the droplets will strike the walls of the housing surrounding the scrubbing zone and coalesce and run down to the tank carrying the contaminating particles with them. This spinner 24 is of conventional construction and has been used for some years by Taylor and Gaskin, Inc. of Detroit, Mich. It comprises a flat plate having radiating ribs on the underside.

The spinner 24 is, as shown in FIGS. 3 and 4 mounted on the lower end of a spinner boss 58 which is secured to the shaft 56, the boss and shaft forming an integral unit. The opening 74 through the tunnel wall closely surrounds the spinner shaft as shown in FIGS. 3 and 4. Because the pressure within the tunnel is greater than the pressure surrounding it within the housing, atmospheric air within the tunnel will flow down around the spinner shaft as shown by the small arrows in FIGS. 3 and 4 through the opening 74 and into the housing. Thus, no contaminating particles or scrubbing liquid will enter the housing from the scrubbing zone to contaminate the bearing 60. The bearing is both physically isolated from the contaminates and is also hydrostatically isolated being in a zone of higher pressure. In the prior art, so far as I am aware, no one has conceived of this arrangement and thus the spinner shaft bearings are subject to destruction by the chemical and/or abrasive action of the contaminating particles and the scrubbing liquid.

As shown in FIG. 1-4 the spinner shaft is driven by a pulley 64 mounted thereon and connected by a belt drive to an electric motor 66 mounted on the outside of the housing 10, the belts extending through the tunnel from the motor to the spinner shaft. Thus the motor and belt drive are readily accessible for servicing.

A stream or jet of water 21 is delivered to the underside of the spinner plate 24 from the upwardly opening end 22 of a pipe 20. A central opening in the baffle array 23, aligned with the spinner, admits the stream of water through the array to impinge on the underside of the spinner. The spray pattern 26 is located above the baffle array 23 and diffuses upwardly through the cylindrical housing 13 creating an intense gas scrubbing zone in this area.

The scrubbing liquid from the tank 15 is delivered under pressure to the pipe 20 by a pump P driven by an electric motor M, both of which are schematically shown because of their conventionality. The pump draws liquid from the tank 15 and forces it under pressure through pipe 20 to the outlet 22.

As the gas passes upwardly through the baffle array 23 its direction is abruptly altered because of the tortuous path therethrough, and some of the contaminates will collect on the wet surfaces of the baffles and be washed back down into the liquid in the tank 15. Then the gas enters the scrubbing zone where the intense spray pattern 26 created by the spinner causes entrainment of more of the contaminates in the liquid droplets. Some of these droplets strike the walls of the housing and run back down to the tank. Other droplets with captured contaminant particles continue with the gas stream upwardly into the hood 28 collecting on the inner wall surfaces thereof and run back down into the tank 15. In addition, as the gas stream undergoes a reversal of direction in the hood droplets are thrown out of the gas stream and collect on the inner walls of the hood, and non-captured contaminates are also thrown out of the gas stream against the hood walls and are captured by the liquid on the walls to run back with such liquid to the tank 15. The direction of gas flow is idealized by the arrows shown in FIG. 1.

The gas flow is downwardly out of the hood where it again impinges on the surface 16 of the scrubbing liquid in the tank 15. Its direction is again abruptly reversed causing a further throw-out of contaminating particles into the scrubbing liquid in the tank 15. The gas then passes upwardly through an eliminator baffle array 30 whose function is to separate residual droplets from the gas stream before the stream leaves the housing through the outlet 32. Gas flow is illustrated by arrows in the drawing. An observation station 31 is provided for visual inspection of the housing.

The sediment resulting from the particles coming in contact with the liquid collects at the bottom 40 of tank 15 and is removed by means of an endless conveyor 42. Scrapers 44 are attached to the conveyor belt which thereby facilitates the removal of the sediment at the bottom of the tank which sediment passes through outlet 46. The conveyor is operated by means of motor 48 which is attached to a pulley 50 by means of a belt or chain means 52.

It has been found that substantially improved efficiencies are obtained when the air is introduced into the housing which is divided into two cylindrical segments 13a and 13b, best shown in FIG. 2. Their dual motors 66a and 66b drive pulleys 70a and 70b, respectively, which in turn are connected to a spinner shaft pulleys 64a and 64b respectfully by a belt or chain 72a or 72b.

In a typical design embodying the invention the flow of gas through the inlet 12 of the gas scrubber may be on the order of 5,000 to 50,000 cubic feet per minute. The overall flow rate into and out of the scrubber is relatively constant. However, in the various segments of the equipment, the particles in the air will decelerate as the volume for movement of the air increases.

For example, as the air passes from that portion of the housing surrounding the tunnel to the upper portion 28 of the housing, the particles and air can slow down due to the larger volume for the air to be present. This further assists the separation of the particles.

It is to be appreciated that other modifications may be added to the gas scrubber in order to improve the air flow path to increase removal of the particles. For example, baffle plates (angularly of vertically arranged) may be placed immediately below eliminator 30 so as to modify or straighten out the flow of the gas as comes in contact with the eliminator 30.

Also, the water pumped out the outlet 22 may take the form of a water jet which flow rate may be varied depending on particle size. Generally the flow rate of the water is about 40 gal/1000 CFM of gas passed through the inlet.

It should also be mentioned that the portion of the housing having the eliminator 30 may be divided so as to permit not only two contacts of the gas with the surface of the liquid reservoir but perhaps three or more by appropriately arranging another weir (not shown) as desired.

It is to be further appreciated that the gas scrubber of the present invention can be used with particles at least of the size about 0.5 micron. The contaminant composition in the gas may vary substantially. The contaminant may be debris from machines, fine sand, fumes from metal electrodeposition, such as from chromium electrodeposition, buffing and polishing debris, airborne paint spray particles as from a spray booth, and the like.

The gas scrubber of the present invention may also be used to remove air contaminants other than solid particulates, such as organic spray or bubbles or droplets entrained in the gas. An example is oil of kerosene droplets which are emitted from various machines. In such a situation, the conveyor apparatus 42 for removing sediment will not be employed but rather an oil-liquid separator (not shown) will be used. It is to be appreciated that a bifurcated housing (providing two cylindrical portions 13a and 13b) shown in the drawings may be modified whereby only such is used; other times 3 or more may be desired. In addition, the inlet 12 need not be located as shown, but may be disposed at the side of the housing.

In a test typical of the apparatus above described having the two cylindrical housing segments 13a and 13b, an oil mist laden air stream taken from the exhaust of transmission valve body machining apparatus in a large automotive plant was introduced into the inlet 12 at the rate of 21,599 CFM and sampling of the air exhausting from the air scrubber at outlet 32 showed a collection efficiency of 76.1 percent with 0.43 milligrams of oil per cubic meter of exhausting air. This is well below the health requirement of 0.50 milligrams per cubic meter.

Figure 7:
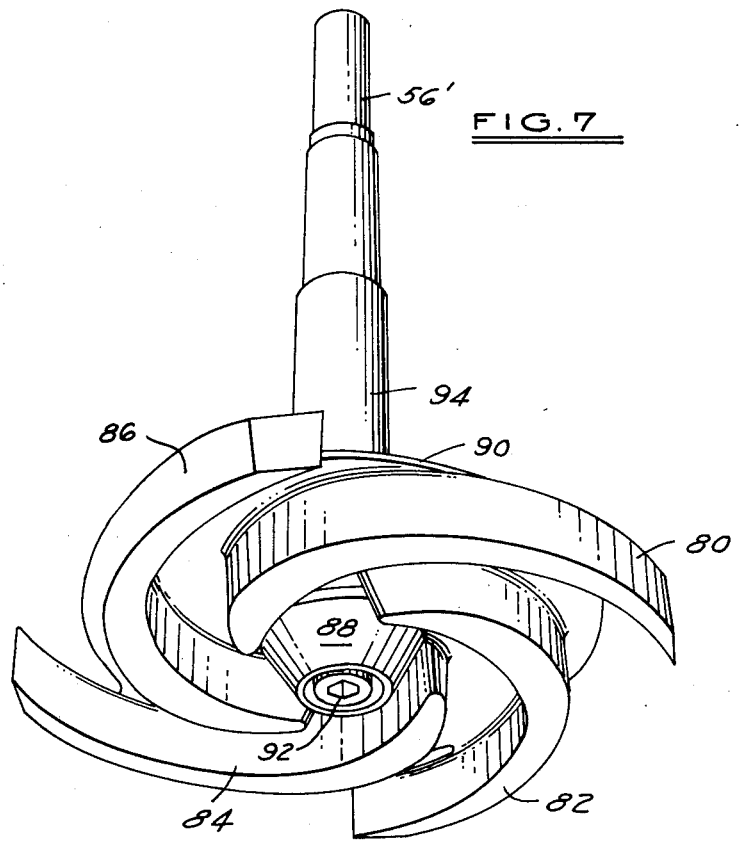
FIG. 7 is a perspective view of a liquid diffusing spinner suitable for use with the apparatus of FIGS. 5 and 6.

I have discovered that the efficiency of air scrubbing can be maintained, if not improved, while at the same time reducing the cost of manufacture of the apparatus as well as its cost of operation. In FIGS. 5, 6 and 7 I have shown an air scrubber of the wet collector type which accomplishes these advantages results. Structurally the air scrubber is identical with the air scrubber above described with the following exceptions (like reference numerals are used in FIGS. 5–7 for parts corresponding to those above described).

Motor 66 pulley 64 and the drive belt 72 are eliminated from the structure as shown in FIGS. 5 and 6. The spinner place 24 has substituted for it a spinner shown particularly in FIGS. 6 and 7 having a helical arrangement of blades 80, 82, 84 and 86 surrounding a conically shaped member 88 which bears against a disc-like portion 90 of the diffuser with a bolt 92 extending through the conical member and securing it and the diffuser to the lower end of the spinner boss 94. The spinner boss 94 extends through a closely fitting opening 74' in the tunnel shroud 54' and the bearing support for carrying the spinner and the bearing itself are housed within the tunnel and comprise the sole support for the spinner shaft and the diffuser at the lower end thereof.

I have discovered that with the use of a free wheeling diffuser having helical blades as shown in the drawings, that the force of the water or other scrubbing liquid delivered from the outlet 22 'of the delivery pipe 20 ' impinging against the underside of the diffuser will spin the diffuser and create an extremely uniform spray pattern 26'. It is my belief that the spray pattern created by the free wheeling diffuser does not contain pie shaped "windows" through which the contaminated gas may flow without being subjected to the scrubbing action, which pie shaped windows may occur where the diffuser is power driven as by the motor 66. It is my belief that the diffuser speed will be directly related to the force and quantity of the water impinging on the underside of the diffuser and that the spray pattern created will be uniform in all directions as a result of the reaction of the water striking the helically shaped vanes and being diffused throughout the scrubbing zone. It is possible that with a power driven diffuser, the diffuser speed may open up pie shaped windows in the spray pattern thus allowing contaminated gas to pass through the spray pattern without being subjected to the scrubbing action.

In a test typical of apparatus of the type disclosed in FIGS. 5–7 oil mist laden air exhausting from transmission valve body machining apparatus at a large automobile plant was introduced through the inlet 12' at the rate of 20,661 CFM and the scrubber resulted in a collection efficiency of 77.2 percent with 0.41 milligrams of oil per cubic meter of exhausting gas at the outlet 32'. It will be noted that the efficiency is slightly better than the efficiency of the apparatus disclosed in FIGS. 1–4 inclusive. In addition, as no motors were necessary for driving the diffuser both the cost of the apparatus as well as its cost of operation were reduced.

What is claimed is:

1. A gas scrubber of the wet collector type comprising, in combination:
   a housing defining a gas inlet and a gas outlet and a liquid reservoir,
   gas exhaust means cooperating with the housing for moving gas therethrough under a negative pressure from the inlet to the exhaust means and forcing it out through the gas outlet,
   a tunnel extending into the housing in the path of negative pressure gas flow therethrough and open to the atmosphere at least at one end,
   a spinner shaft in the tunnel projecting at one end through an opening in a wall thereof and into the path of gas flow through the housing, with the opening being larger than the spinner shaft but closely surrounding the shaft to create an atmospheric flow from the tunnel around the shaft and into the housing sufficient to substantially prevent entry of scrubbing liquid and/or contaminates into the tunnel through the opening around the shaft, bearing means located entirely within the tunnel and spaced from said opening around the spinner shaft and comprising the sole support for the spinner shaft and supporting it for rotation, liquid diffusing spinner means mounted on said one end of the spinner shaft outside the tunnel and arranged to diffuse a stream of liquid striking it in a spray pattern extending across the path of gas flow, and liquid delivery means for withdrawing liquid from the liquid reservoir and directing a stream of the liquid against the diffusing spinner to diffuse the same into a pattern as aforesaid.

2. The invention defined by claim 1 wherein the spinner shaft is free wheeling, and the liquid diffusing spinner means has a face opposed to the stream of scrubbing liquid from said liquid delivery means, which face is provided with spinner impelling and spray pattern generating blades for rotating the spinner means in response to impingement of the stream thereagainst at a speed dependent upon the force and volume of the liquid impinging thereon.

3. The invention defined by claim 1 including motor means connected to the spinner shaft in the tunnel for driving the same.

4. The invention defined by claim 1 wherein said housing defines a plurality of gas scrubbing zones each having a tunnel extending transversely thereof and provided with a spinner shaft and liquid diffuser, and gas entering through said inlet is divided with a portion passing through each such zone.

5. The invention defined by claim 1 wherein the spinner shaft is arranged vertically, and projects at its lower end through a closely fitting opening in the bottom of the tunnel, and the pressure differential within the tunnel and within the housing creates a gas flow from the tunnel into the housing around the shaft preventing a reverse flow of scrubbing liquid and/or contaminates through such opening.

* * * * *